June 25, 1946. F. W. BOYLE 2,402,868
PACKING FOR PIPE JOINTS
Filed Aug. 27, 1943
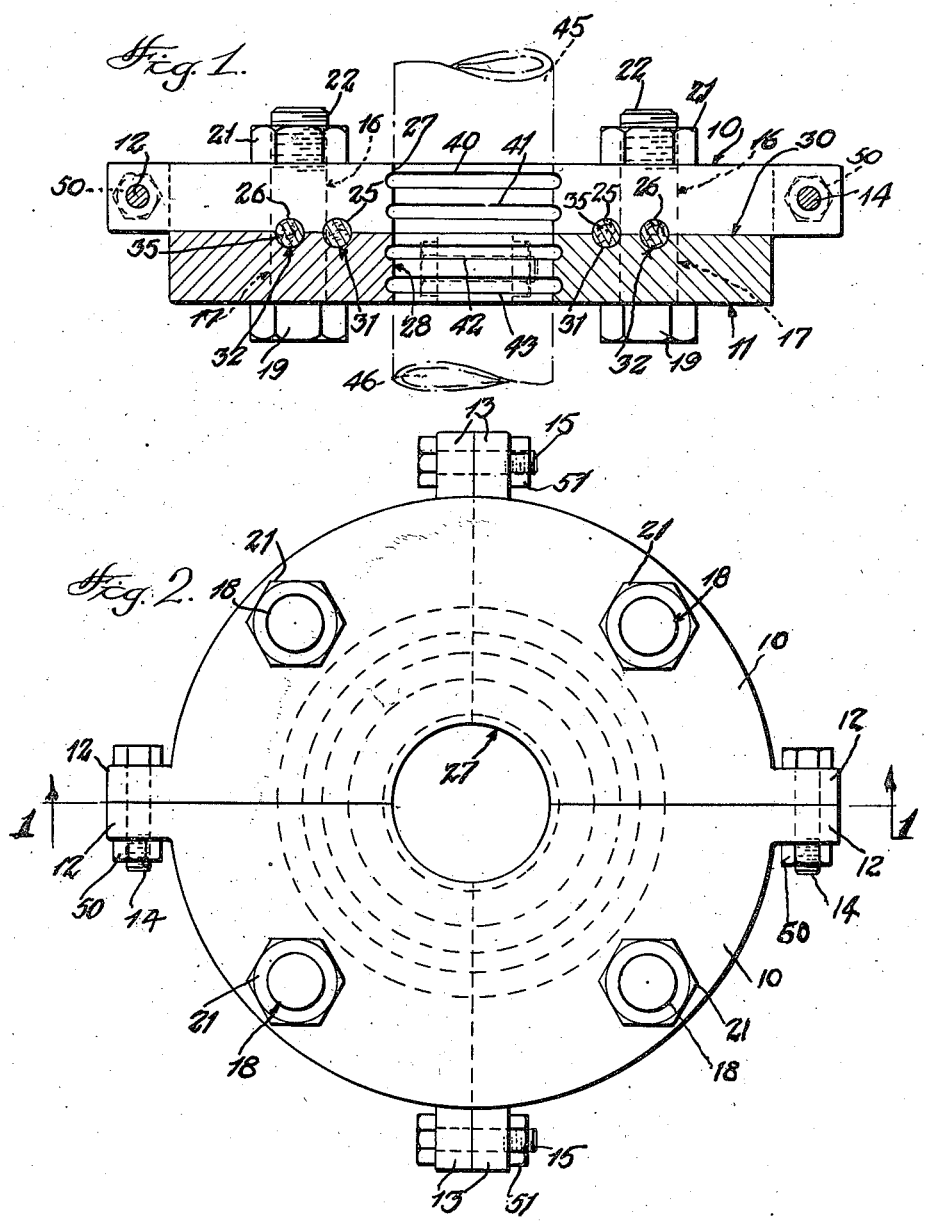
Inventor
Frank W. Boyle
By Munn, Liddy & Glaccum
Attorney Patented June 25, 1946

2,402,868

UNITED STATES PATENT OFFICE 2,402,868

PACKING FOR PIPE JOINTS

Frank W. Boyle, Berwyn, Md.

Application August 27, 1943, Serial No. 500,252

1 Claim. (Cl. 285—137)

This invention relates to packings for pipe joints.

An object of the invention is the provision of a means for uniting adjacent ends of lengths of pipe by coupling members composed of united sections which clamp around the ends of the pipe sections and have complementary faces which are grooved to receive two or more separated packing rings forming a multiple safety seal. The united sections of one member on one pipe section are so disposed with reference to those of the complementary section on the joining length of pipe that the respective parting lines of the different sections are offset one with respect to the other, the united sections being bolted together in areas beyond the periphery of the outermost ring of packing. The arrangement of the parts is such that the parts of the coupling may be made of cast metal and used in the field to effect connections capable of withstanding high pressures and without the necessity of performing any expensive machining operations to obtain the desired close fitting of the parts.

A further object of the invention is the provision of a packing having broad surfaces in contact with each other and formed with facing grooves to provide annular channels to receive separated rows of packing material compressed within the grooves, the arrangement being such that if one section of the packing is blown the other section will be maintained to prevent the loss of fluids.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claim.

In the drawing:

Figure 1 is a transverse vertical section of the packing taken along the line 1—1 of Fig. 2.

Figure 2 is a plan view of the same.

Referring more particularly to the drawing, it will be seen that pairs of semi-circular plates 10 and 11 are located in face to face relation. Each of the plates 10 is provided with an ear 12 extending outwardly and centrally therefrom. Each of the plates 11 is provided with radial ears 13 in contact with each other as are the ears 12, as shown in Fig. 2. However, the ears 12 of the plates 10 are located at 90° from the ears 13 of the plates 11. Therefore, when the adjacent ends of two sections of pipe are brought together the contacting edges of the plates 10 are at right angles to the contacting edges of the plate 11.

Bolts 14 and 15 connect the respective ears 12 and 13 together to form a single circular plate for the top of the packing and a single circular plate for the bottom of said packing.

Plates 10 are provided with a plurality of circumferentially spaced openings 16 which are alined with openings 17 in the plates 11. These alined openings receive bolts 18 having heads 19 engaging the outer surface of the plates 11 while nuts 21 screwed onto the threaded ends 22 of said bolts engage the outer face of the plates 10 for drawing the plates into cooperative relation.

The inner faces of the connected plates 10 are provided with a pair of annular grooves 25 and 26 which are semi-circularly shaped in cross-section. The connected plates 10 have a central passage 27 which alines with a passage 28 in the connected plates 11.

The inner faces 30 of the plates 11 are provided with a pair of grooves 31 and 32 which are semi-circularly shaped in cross section and which are concentric with respect to the passage 28 in the combined plates 11. Since these grooves are sunk into the plates 11 from the face 30 and are alined with the adjacently disposed grooves 25 and 26 they will form with the last mentioned grooves a pair of separated annular channels.

A packing 35 which may be formed of flax or semi-metallic material is compressed into the annular channels between the plates 10 and 11 to provide an absolute seal against the loss of fluids. While two types of packing have been suggested it will be appreciated that any of the well known high pressure steam packings may be employed for the purpose. This packing is circular and neatly fits between the confronting walls of the annular groove 25, 31 and 26, 32 and when the two plates are drawn together by the nuts 21 on the headed bolts 18, the separate packing rings will be firmly compressed in the annular channels, and will prevent the loss of fluids.

A pair of annular grooves 40 and 41 are formed in the walls of the passage 27 in the combined plates 10 while a pair of grooves 42 and 43 are formed in the walls of the passage 28 in the combined plates 11.

The ends of pipes 45 and 46 are inserted into the respective passages 27 and 28 and a suitable tool is employed for forming beads which expand said pipes to effect a tight fit in the corresponding grooves 40, 41 and 42, 43.

Thus it will be seen that the joint which is formed by the connected plates 10 and 11 is thoroughly sealed against the loss of fluid because the separated rings of packing between the inner contacting surfaces of the plates located in the grooves 25—26 and 31—32 is securely held against displacement.

If the portion of the packing in the cooperating inner outer grooves 25 and 31 should be blown the remaining packings in the grooves 26—35 would hold and prevent the loss of fluid at the joint. In other words, the joint is doubly sealed by the packings 35 and by the flat contacting surfaces of the plates 10 and 11. When it is desired to disconnect two sections of pipe the bolts 18 will be removed and if the coupling members are to be removed it is then only necessary to withdraw the bolts 14 and 15 after unscrewing the respective nuts 50 and 51.

Furthermore, these plates, together with the ears 12 and 13 are formed of steel and under test have resisted the loss of steam up to 6,000 pounds pressure. The construction affords a triple safety protection against the loss of fluids.

I claim:

A coupling means for uniting adjacent ends of different pipe sections comprising two complementary coupling members each composed of two flat sections bolted together edgewise having a central aperture provided with grooves to receive beads formed on the pipe walls, said members being bolted together at their periphery with the meeting lines of their respective sections out of register and said members also having flat engaging faces provided with concentric registering channels separated from each other, and separate rings of packing material compressed in said channels.

FRANK W. BOYLE.